Feb. 9, 1937.   G. C. WOODRUFF   2,070,347
CONTAINER FOR CONTAINER CARS OR AUTOMOBILE TRUCKS
Filed April 24, 1934   4 Sheets-Sheet 2

INVENTOR
Graham C. Woodruff
BY
ATTORNEY

Feb. 9, 1937.  G. C. WOODRUFF  2,070,347
CONTAINER FOR CONTAINER CARS OR AUTOMOBILE TRUCKS
Filed April 24, 1934   4 Sheets-Sheet 3

INVENTOR
Graham C. Woodruff
BY
ATTORNEY

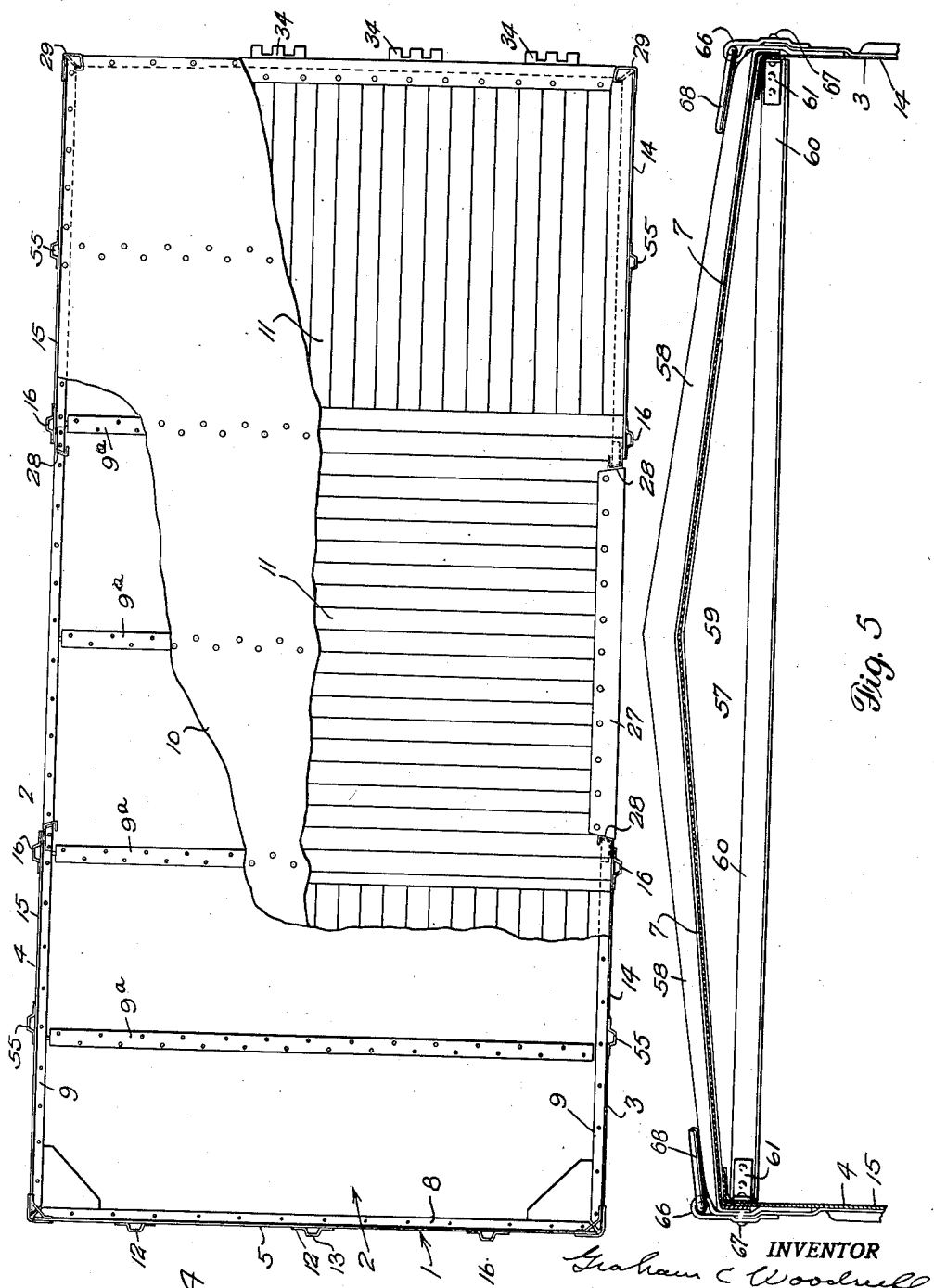

Patented Feb. 9, 1937

2,070,347

UNITED STATES PATENT OFFICE 2,070,347

CONTAINER FOR CONTAINER CARS OR AUTOMOBILE TRUCKS

Graham C. Woodruff, Bronxville, N. Y., assignor to The L. C. L. Corporation, a corporation of Delaware Application April 24, 1934, Serial No. 722,191

2 Claims. (Cl. 220—1.5)

This invention relates to improvements in containers for container cars or automobile trucks, and has special reference to the provision of a container of large size, such as double the size of a standard container, thus enabling transportation of a large amount of lading in each container.

One object of the invention is to provide a double size container which is adapted to conveniently fit within the compartment or standard receiving space of two standard size containers on a rigid-sided gondola type of container car, longitudinally of the car, or to serve as the removable container body of an automobile truck interchangeable with other bodies of its kind, so that a large capacity container suitable for either of these purposes may be furnished, which container notwithstanding its large size and capacity, will, nevertheless, be comparatively light in weight but strong and durable in construction and capable of being built and operated at comparatively low construction and maintenance costs.

A further object of the invention is to provide a novel construction of the container whereby the foregoing advantages are gained.

A still further object of the invention is to provide a container having doors of such number and so located as to facilitate and render easier loading and unloading of the container.

With these and other objects in view, the invention consists of the novel features of construction, combination and arrangement of parts hereinafter fully described and claimed, and as shown in the accompanying drawings, in which:—

Fig. 4 is a sectional plan view of the container with parts broken away to better show the construction.

Fig. 5 is a vertical transverse section on the line 5—5 of Fig. 1.

Figure 1:
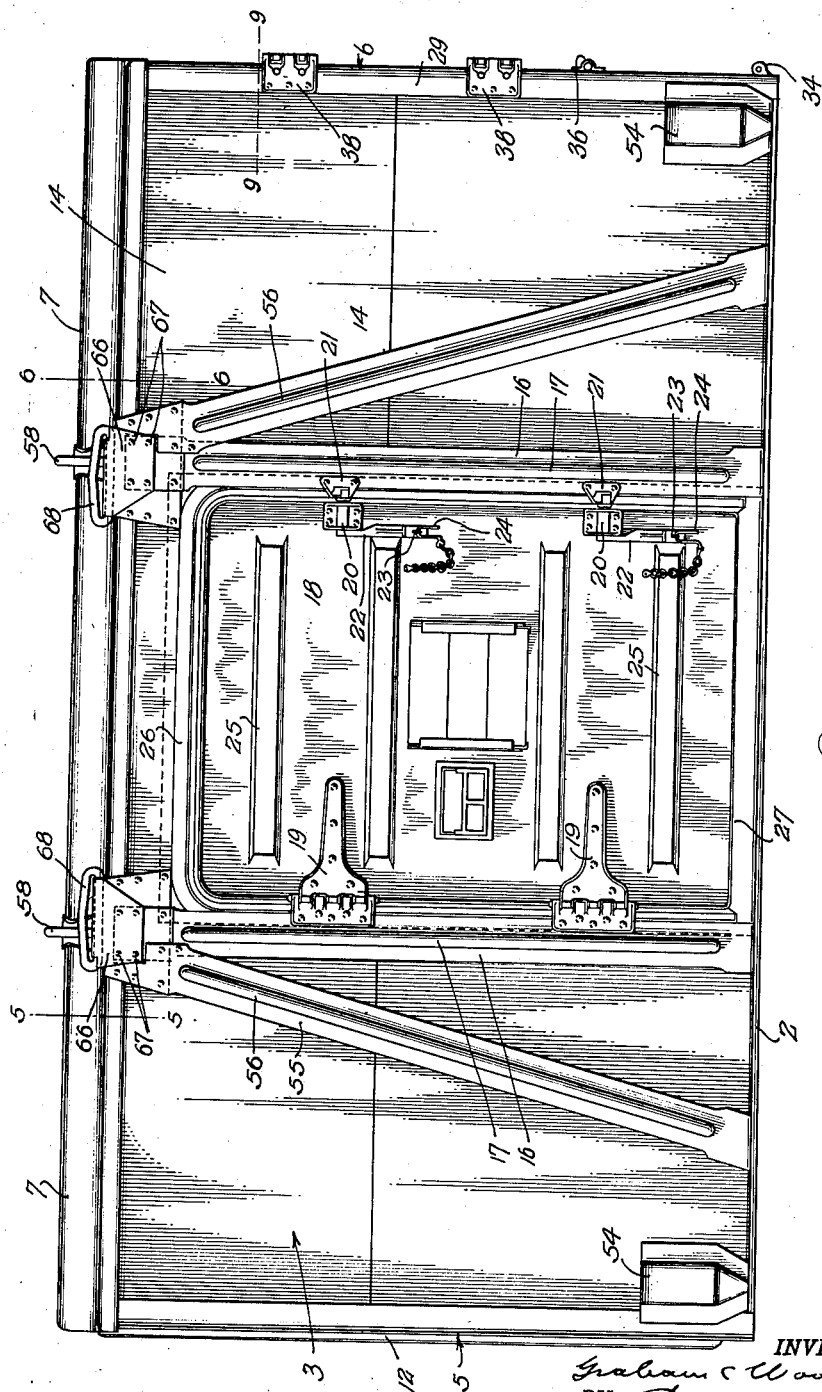
Fig. 1 is a view in side elevation of a container of the character described embodying my invention.
Figure 2:
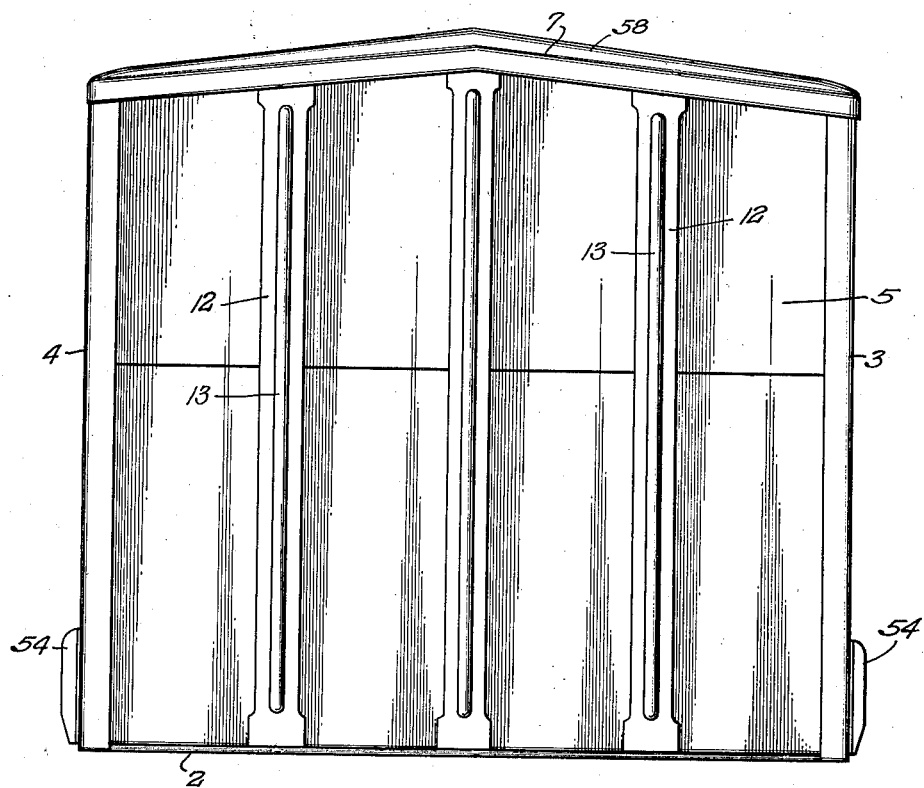
Figs. 2 and 3 are opposite end elevations of the same.
Figure 9:
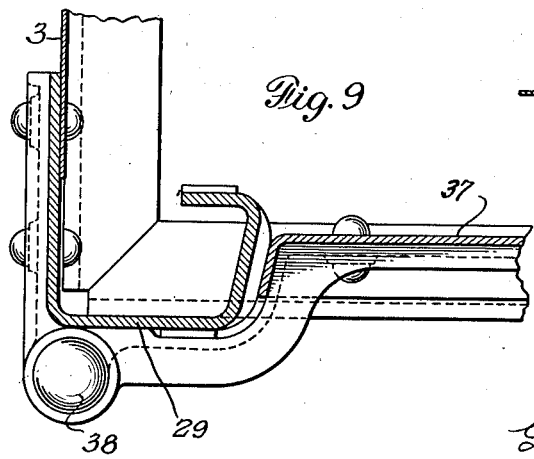
Fig. 9 is a section on line 9—9 of Fig. 1.
Figure 7:
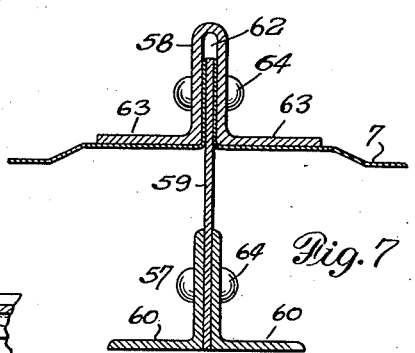
Fig. 7 is a section on the line 7—7 of Fig. 6.
Figure 3:
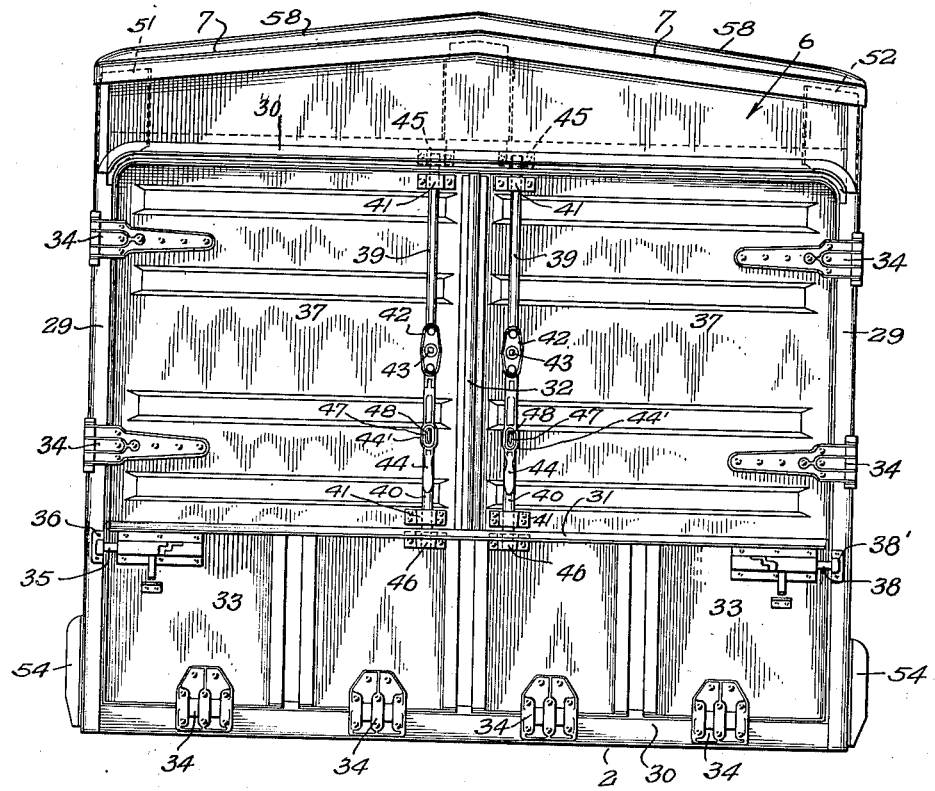
Figure 6:
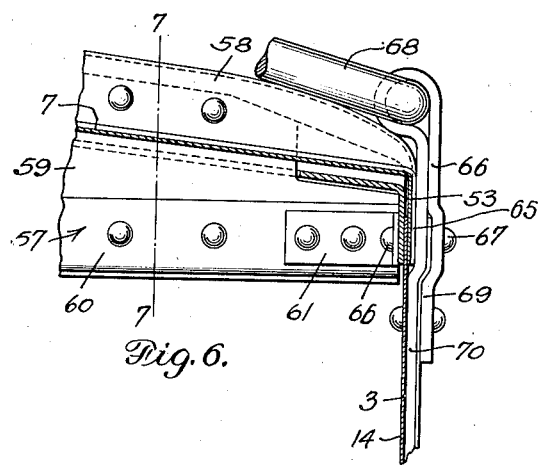
Fig. 6 is a similar section on the line 6—6 of Fig. 1.
Figure 8:
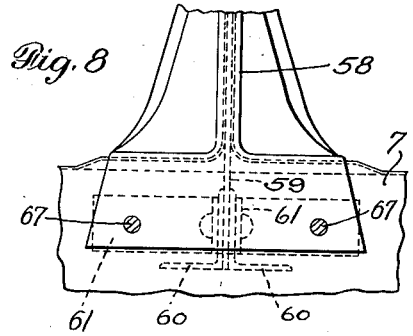
Fig. 8 is a view showing a feature of construction.

In carrying my invention into practice I provide a container 1 of oblong rectangular form and preferably double the size of a standard sized container and adapted to be received in the compartment or space on the car normally intended to receive two longitudinally alined containers of the standard size. The above described form and size of the container is also such as to adapt it for use upon an automobile truck, as a removable lading containing body for the truck, which is interchangeable with other similar containers. I, however, do not limit the invention, except when specifically set forth in the claims, to a container of such form or size, as certain features of the invention may also be used in containers of standard or other suitable size.

The container comprises a bottom 2, side walls 3 and 4, end walls 5 and 6, and a top wall 7. The bottom 2 consists of channeled end sills 8 and side sills 9, and I-beam floor supports 9a extending between and secured to said side sills, on which I-beam floor supports 9a is laid a floor structure embodying a sub-flooring 10 of plywood and a top flooring 11 of floor boards, which parts are suitably united.

One of the end walls, as the end wall 5, is or may be continuous, or made without doors, and formed of strong sheet metal reinforced on the outside by vertically disposed flanged, channel-shaped pressed metal stiffeners or stays 12, the channel portions 13 of which project outwardly in the form of strengthening ribs which also serve as guides and fenders to protect the wall from injury when being loaded onto or unloaded from a car or truck. The side walls 3 and 4 and end wall 6, however, are of special construction and provided with doors of a style and arrangement to facilitate and render easy the loading and unloading of the container, and such walls are composed of parts combined and arranged in such manner as to afford maximum convenience for such purpose without reduction of strength or durability of the container.

The side walls 3 and 4 are similar in construction and each comprises metal sheets 14 and 15, respectively, to which are secured vertical stiffeners 16 which are similar in construction to the stiffeners 12, and the channeled portions 17 of which also extend outwardly in the form of strengthening and guide and fender ribs 17'; said stiffeners being arranged at the sides of a central doorway preferably extending substantially the full height of the container. This doorway is adapted to be closed by a horizontally swinging door 18 mounted by hinges 19 on one of said stiffeners 16 and provided with bolts or other suitable fasteners 20 to engage keepers 21 on the other stiffener 16, for holding the door in closed position. These bolts may be provided with operating handles 22 engageable in the locking position of the bolts with eyes 23 on the door, through which a retainer or hook 24, adapted to take an ordinary railroad seal, may be passed for obvious purposes. The door may be furnished with bracing or reinforcing members 25 of any suitable type to give it requisite strength and rigidity. This door allows the container to be loaded or unloaded from the side and is of sufficient size to permit lading of various sizes within the capacity of the container to be loaded or unloaded with great ease and facility. Suitably secured in place at the top, bottom and sides of the doorway are lintel and threshold plates 26 and 27 and door jambs or posts 28, and suitably secured in place at the junctions of the outer edges of the plates of the walls 3 and 4 are the corner posts 29.

The end wall 6 comprises sheet metal plates secured to the top wall 7, to the corner posts 29 and to a lintel 30. The lintel 30 extends the full distance between the corner posts at the top of a doorway which also extends the entire width of the wall between the corner posts 29 and the full depth of the wall below the lintel and between the lintel and a threshold plate 31 located at the level of the floor or bottom of the container. The upper portion of this doorway is adapted to be closed by a pair of swinging doors 32, while the lower portion of the doorway is adapted to be closed by a vertically swinging door or tail gate 33. The doors 32 are located on opposite sides of the vertical center of the doorway and are mounted at their outer edges on hinges 34 fastened to the corner posts 29, one of said doors being provided at its free or swinging edge with a pressed metal reinforcing and lap strip 35. The door 33 is mounted at its lower edge on hinges 34 to swing outwardly and downwardly from a closed position to fully open the portion of the doorway below the doors 32 or to be disposed when open in a horizontal or slightly downwardly inclined position to serve as a gangway over which the lading may be carried or trucked to enable loading or unloading to be carried out with greater ease and convenience and with a saving of time. The door 33 extends the full distance between the posts 29, or the full width of the doorway, so that such operations may be carried out by the use of a single door. An angle metal stiffener 37 is preferably provided along the free edge of the door 33, and the door may be otherwise strengthened and reinforced, to give it the requisite degree of strength and rigidity. Sliding bolts 38 are provided at the ends of the door 33 for engagement with keepers 38' on the posts 29 to secure said door 33 in closed position.

A novel type of bolt mechanism is provided for locking the doors 32 in closed position. This comprises longitudinally alined, vertically disposed upper and lower bolts 39, 40, slidably mounted in guides 41 and pivotally connected at their inner ends to the oppositely extending arms of a rocker lever 42 mounted on a trunnion pivot 43. To one of the lever arms is connected, as at 44', an actuating lever 44 whereby the lever 42 may be rocked to project or retract the bolts. The upper ends of the bolts 39 are adapted to engagement with keepers 45 on the lintel 30 or other suitable portion at the top of the doorway, while the lower ends of the bolts 40 are adapted for engagement with keeper members 46 at the upper edge of the door 33 when said door is in closed position. It will thus be seen that the lower door section or tail gate 33 is adapted to be secured in a vertical or closed position by moving the bolts 38 into engagement with the keepers 38', and that with the lower door section in this position the keepers 46 are in proper position to receive the vertical locking bolts 40 of the top door sections 32. With this arrangement, the lower door section 33 may be kept closed, even though the top door sections are open, until its use in a let-down position is necessary. The connection 44' of lever 44 with the trunnion pinion 43 is a pivotal connection adapting said lever to be swung outward at an angle to an operating position in which it may be manipulated to actuate the shaft to retract or project the bolts, and to be swung inwardly to an inoperative and retaining position parallel with the bolts 40. The lever is provided with a keeper opening 47 for the passage therethrough of an apertured locking lug 48 on the bolt 40 when the lever is in the latter-named position, through which aperture the hasp of a lock or an ordinary car door lock seal may be passed when the doors of the loaded container are closed.

The container may be mounted upon a car or truck in such manner that the walls of the car body or truck will prevent the container doors from being opened as long as the container is carried thereby. The locks provided on the container will give additional security in this connection and guard the container against surreptitious entry at all other times.

The body structure of the container may include, besides the features before described, suitable bottom and top side and end reinforcing or frame bars which may be bolted, riveted, welded or otherwise suitably attached to each other and to the sheets of the body walls. At the top corners of the body at large door end the frame bars and walls are tied and braced by stays or flanged gussets 51 and 52, suitably secured thereto. The top wall herein shown is one of that type which slopes from its center toward opposed walls of the container and is provided with a downturned flange 53 united to the side and end walls. Guide shoes 54 upon the side walls of the container are provided to cooperate with external reinforcing elements on the container body and body of the container car or truck to guide the container in its movements as it is being applied to or removed from a container car or truck and to prevent longitudinal shifting of the container when in position thereon.

In order to strengthen and reinforce the container at each side provided with the doors 18 I provide the diagonally arranged pressed steel channel shaped stiffeners 55, each having their outstruck reinforcing flanges 56, which stiffeners are suitably fastened at their lower ends to the bottom and side wall sheets. The upper ends of these stiffeners 55 partially overlap the upper ends of the jambs 16 and are secured with the latter to the side wall and top wall sheets. Also fastened to the side and top walls with the upper ends of the stiffeners 16 and 55 at both sides of the container are special connecting and reinforcing means whereby the container may be coupled to a hoisting crane and swung into and off the car and otherwise handled without liability of injury. Such means comprises transverse girders disposed on each side of the transverse center of the container and extending between the upper ends of opposed jambs 16 of the sides 3 and 4 which are in transverse alinement with each other. Each of these girders may be of any suitable construction but as shown comprises a lower reinforcing beam 57, an upper reinforcing or ridge beam 58, and an intermediate brace or web plate 59. As shown, the lower reinforcing beam 57, which is arranged substantially at the same level as the upper edges of the container sides 3 and 4, comprises a pair of L-shaped plates 60 extending between the container sides 3 and 4, to the ends of which are secured angle brackets 61. Between these plates 60 fits the lower edge of the brace or web plate 59. The beam 58 is arranged immediately above the beam 57 and across the top wall or roof 7 and is substantially T-shaped, said beam comprising a central upstanding U-shaped web or fold 62 and oppositely extending bottom flanges 63, which fold receives the upper edge of the web plate 59 which is united to the beam plates 60 and fold 62 by rivets or bolts 64. The web or fold 62 terminates at its ends adjacent the walls 3 and 4 and from such points the beam 58 extends in the form of portions 65 which are bent downward over the downturned edges of the roof sheet behind lifting link brackets 66, all of which parts, together with the upper ends of the jambs 16 and stiffeners 55, are fastened together by rivets 67. The brackets carry any suitable form of lifting links 68 with which may be engaged suspending elements of a hoisting crane or like hoisting device for the purpose of raising and lowering and swinging the container in loading it onto and unloading it from a container car or truck. By the construction of the parts above described it will be seen that each wall 3 and 4 is not only reinforced in a simple manner but to a maximum degree to enable a high and wide doorway to be placed therein without weakening such wall with relation to the other container walls, but that the walls 3, 4 and 7 are braced at the points of lift and across the container along the lines on which lifting strains fall, thus effectually obviating any liability of the container collapsing under such strains even when filled to full capacity with heavy lading.

It frequently happens that material to be shipped in a large quantity to a given destination is beyond the capacity of a single container of a standard size, requiring the use of two containers for a single shipment. This not only involves the handling of two separate containers, but, where the lading is insufficient to fill both containers, also involves the loss of shipping space. In some cases also the standard size contaner is too small for the reception of machinery or other articles in the form of large units, or goods customarily shipped in large amounts at a time. My improved double-size container has been designed to occupy the same space on a car as that now occupied by two standard size containers occupying the same space on a car. The described construction and arrangement of the doors in this container affords greater convenience and facility in loading and unloading the container. The double size of the container not only adapts the container to be fitted longitudinally of a container car in the space normally allotted to two transversely alined standard containers, but a double size container of this type is also adapted for use as a removable container body on an automobile truck of convenient capacity and may be interchangeably used on such trucks or on both automobile trucks and container freight cars. The provision of the drop door or tail board is not only of advantage in generally facilitating loading and unloading of the container, but this drop door is adapted to be used as a tail gate or as a gang plank when the double size container is used as an automobile truck body. If it is desired to handle lading with a truck, between the container and a station platform or freight car, the auto truck is backed up thereto and the drop door lowered until it rests in a horizontal position on the car floor or station platform so that it may be used as a gang plank.

From the foregoing description, taken in connection with the drawings, the construction, mode of use and advantages of my improved container will be readily understood by those versed in the art without a further and extended description. While the construction of the container herein disclosed for purposes of exemplification is preferred, it will be understood that changes in the form, proportions and details of construction of the parts may be made within the scope of the appended claims, without departing from the spirit or sacrificing any of the advantages of the invention.

What I claim is:

1. A container for container cars or auto trucks comprising a container body of rectangular form and having at one of its sides a bottom drop door extending substantially the full width of said side and adapted to serve as a tail gate or gangway platform, a horizontally swinging door arranged above said drop door, keepers on the sides of the container at right angles to the first-named side, bolts on the drop door to engage said keepers, keepers arranged respectively on the drop door and on the container above the horizontally swinging door, a centrally pivoted actuating lever on the horizontally swinging door, and upper and lower sliding bolts on the horizontally swinging door connected to the lever on opposite sides of its pivot and actuable by said lever to engage the latter-named keepers to simultaneously lock the horizontally swinging door at its upper edge to the container body and at its lower edge to the drop door at an intermediate point between the fastening bolts of said drop door.

2. A container for container cars or auto trucks comprising a container body of rectangular form and having at one of its sides a bottom drop door extending substantially the full width of said side and adapted to serve as a tail gate or gangway platform, a plurality of horizontally swinging doors arranged above said drop door on opposite sides of the vertical center of the container, keepers on the sides of the container at right angles to the first-named side, bolts on the drop door to engage said keepers, keepers arranged respectively on the drop door and on the container above the horizontally swinging doors, centrally pivoted actuating levers on the horizontally swinging doors, and a set of upper and lower vertically sliding bolts on each horizontally swinging door connected to the lever thereon on opposite sides of its pivot, said sets of bolts being actuable by the levers to engage the latter-named keepers to lock the horizontally swinging doors at their upper edges to the container body and at their lower edges to the drop door at points between the fastening bolts of said drop door.

GRAHAM C. WOODRUFF.